No. 748,940.                                    Patented January 5, 1904.

UNITED STATES PATENT OFFICE.

FREDERICK A. FELDKAMP, OF NEWARK, NEW JERSEY, ASSIGNOR TO ELECTRA MANUFACTURING COMPANY, A CORPORATION OF NEW JERSEY.

METHOD OF PRODUCING ELECTRODES FOR STORAGE BATTERIES.

SPECIFICATION forming part of Letters Patent No. 748,940, dated January 5, 1904.

Application filed April 17, 1903. Serial No. 153,110. (No specimens.)

*To all whom it may concern:*

Be it known that I, FREDERICK A. FELDKAMP, a citizen of the United States, residing at Newark, in the county of Essex and State of New Jersey, have invented certain new and useful Improvements in Methods or Processes of Producing Elements or Electrodes for Storage Batteries; and I do hereby declare the following to be a full, clear, and exact description of the invention, such as will enable others skilled in the art to which it appertains to make and use the same.

This invention relates more especially to a novel method or process for producing electrodes or elements for storage batteries by chemical methods, which consists in subjecting a suitable porous material to the action of a salt or salts of lead in solution and then chemically reducing the same, whereby a suitable electrode is produced in which the particles of the active material do not become separated.

The primary object of my present invention therefore is to provide a novel method or process of incorporating in a porous material a reducing agent and then subjecting said porous material to the action of a salt or salts of lead and chemically reducing the same, thereby producing a porous element or electrode which is impregnated with the chemically-produced active material or in which this active material is incorporated in and practically forms a coherent or integral part of the said porous material, which may then be applied to one or both sides of a suitable conductor, such as a lead or other metal plate, or any other conductor. Heretofore the active material has been applied directly to the surface of a metal plate or to a grid, and the same was then sometimes incased in an envelop or shield of fabric or other material; but the difficulty has been to maintain the active material in close contact with the surface of the metal plate, because the escaping gases which are generated force the same away from its close contact with the plate.

I have found that by subjecting a porous material to the action of a salt or salts of lead in solution and then chemically reducing the same the porous material becomes impregnated throughout its body with an active material which will not peel off or disintegrate, the porous material and the chemically-produced active material forming a coherent mass or an integral mass of great porosity which permits the passage therethrough of the electrolyte and also allows the escape of the gases without any deterioration or blistering.

In the following description of my present invention I have enumerated several methods or processes, all of which embody the principles of the present invention, and any one of which may be employed in producing a battery element or electrode composing a suitable porous material impregnated with the active material.

One method or process of carrying out the principles of the present invention is as follows: Against a metal or other suitable conducting plate, preferably lead, which may be solid or may be perforated or which may be in the form of a grid, or against any other suitable plate which is to serve as a conductor, there are arranged or placed one or more pieces of suitable porous material, such as linen, cotton, cheese-cloth, or any other similar porous material or other loosely-woven fabric, this porous material being preferably arranged in layers to provide an electrode body of any desired thickness. These layers of porous material are suitably secured to the metal conductor or inner plate in any manner, but preferably by sewing in the manner set forth in my previous application for Letters Patent, filed July 8, 1902, Serial No. 114,746. Upon this attached porous material is then strewn or sprinkled zinc-dust or granular zinc, the same passing through the pores or interstices of the material until it reaches the inner metal plate and becomes thoroughly incorporated in the said porous material. After this has been accomplished these plates are suspended in a solution of a salt or salts of lead, as acetate of lead or nitrate of lead. Thereupon wherever there are these particles of zinc in the porous material the lead separates from the solution and becomes thoroughly embedded in the porous material in the form of spongy lead. This chemical action continues until the porous frabic practically becomes a reinforced lead plate, in which the fabric is incorporated or embedded, and while the same is of great porosity still a thin plate or electrode having great rigidity is produced and one in which the obtained active material will not peal off or blister. Of course it will be evident that before the porous material or fabric, such as cheese-cloth, cotton, or the like, which has been arranged against the metal plate is sprinkled with the zinc the same may be treated in a bath or solution of nitric acid and sulfuric acid before applying the zinc, whereby the porous material is rendered acid-proof. The combined metal plate and porous material attached thereto are then thoroughly washed and dried and then subjected to the treatment of the zinc in the manner hereinabove set forth. The porous fabric may also be transformed into parchment, which is then also subjected to the treatment of zinc-dust or granular zinc. After these zinc-treated plates have been suspended in the solution of a salt or salts of lead sufficiently long, the solution being preferably stirred from time to time, the plates are removed and thoroughly washed in clear water. The plates are then preferably passed between a set of rolls or other suitable devices to remove the moisture and to reduce any undue porosity in the material. These chemically prepared or rather formed plates or electrodes are then assembled and connected to provide a battery-cell, which is then charged with the electricity and whereby the spongy lead is changed into the peroxid of lead.

Another method of treatment is to take single sheets of porous material, treating each sheet separately with the zinc and then suspending such sheets in a solution of a salt or salts of lead to produce the spongy lead in the porous material in the manner hereinabove described. These separately-treated sheets after they have been removed from the solution of a salt or salts of lead are then washed and pressed in the manner previously set forth and then attached or secured under pressure in close contact with the conducting-plate.

Another method is to soak sheets of porous material directly attached to a metal plate, as above stated, or single sheets of a porous fabric in a solution of a salt or salts of lead, as acetate or nitrate of lead, and thereupon treating these sheets with diluted sulfuric acid, thereby producing sulfate of lead. This method of alternately subjecting the fabric to the lead solution and the sulfuric acid is kept up a sufficient length of time until a coating or layer of the sulfate of lead has been formed. After being washed and dried finely-divided zinc is then strewn upon and caused to enter the pores in the sulfate-of-lead layer and the fabric placed in a solution of common salt, whereupon the sulfate of lead is transformed into spongy lead.

A still further method is to soak the porous material in a solution of a salt or salts of lead and thereupon treating the same with potassium hydroxid, commonly called "caustic potash," to produce hydroxid of lead, which when the potassium hydroxid has a specific gravity of 1.48 and when there is a surplus of the latter is transformed into monoxid of lead, whereby the negative plate is produced. The positive plate is produced by soaking in a solution of lead chlorid heated to 50° or 60° centigrade and then treated in a chlorid-of-lime solution, whereupon all the lead in the lead-chlorid solution is transformed into lead dioxid. In like manner a treatment of the plates in acetate of lead with a chlorid-of-lime solution will produce the lead dioxid.

In place of cotton or other porous fabric treated in the above-stated manner I may substitute other materials or products which are carbonized, such as carbonized paper, blotting paper or pads, certain kinds of porous wood, certain kinds of grasses, leaves, rush-grasses, reed-grasses, and the like, all of which are treated in the solution of a salt or salts of lead and with the zinc in the manner hereinabove set forth, or the same may be treated in the following manner: Arranged against one or both of the surfaces of a conducting-plate—as lead or a grid, or, in fact, any material which acts as a conductor—is a layer or layers of such carbonized material secured in position preferably by means of other suitable fabric—such as cotton, parchment, or the like—which acts as a retaining-sheet for the carbonized material. After these parts have in this manner been assembled they are placed under pressure and sewed together in the manner of my previous invention, Serial No. 114,746, hereinabove mentioned, or these parts may be secured together in any other manner, whereupon the retaining fabric is transformed, as above, into guncotton or parchment. After having been thoroughly washed in clear water and dried the plates thus produced are saturated with an acetate or nitrate of lead solution. When treated with surfuric acid, lead sulfate will be formed, which can then be electrically reduced in the usual manner. In lieu of electrically reducing the lead sulfate I may subject this acetate of lead-plate to a treatment of powdered zinc or granular zinc, in the manner hereinabove fully described, whereby spongy lead is obtained, when the plate containing in its pores the zinc is placed in salt water. When a retaining-sheet of large or coarse meshes is employed, the zinc-dust or granular zinc is sprinkled directly through the meshes of this retaining-sheet and directly upon the carbonized matter, after which this plate is suspended in the acetate or nitrate of lead solution.

It is also practical with my invention to use finely-divided carbon or granular carbon, which is held against the inner metal plate, which serves as a conductor, by means of a retaining sheet or envelop and then treated with the zinc and the lead salt or salts in the manner and for the purposes of my present invention.

In addition to the above elements obtained in the manner of my invention there may be added mechanically litharge or red lead.

From the above description of my invention it will be clearly understood that I have provided a simple and rapid process or method of providing any suitable porous material, such as cotton, linen, cheese-cloth, parchment, carbonized paper, blotting-paper, grasses, leaves, and also finely divided or granular carbon with an active material, the said active material being embedded in the pores of such porous material and the latter being thoroughly incorporated in or impregnated with the active material produced by chemical reduction, as hereinabove stated, and a practically reinforced mass of active material is the result, which when used electrically with a conductor-plate, as lead, or with a grid produces a light and highly efficient storage battery and one in which all undesirable action due to "blistering," "buckling," "shedding," or "peeling" of the active material is overcome.

It will be understood that various modifications may be made in the structure of the electrode or battery element which has been produced according to my novel process or method without departing from the scope of this invention. Hence I do not limit my invention to the particular kinds and character of the porous materials to be used, and the chemical reducing agents may also be varied.

Having thus described my invention, what I claim is—

1. A process or method of producing an element or electrode for storage batteries by chemical reaction, which consists in incorporating in a porous material a reducing agent and then subjecting said porous material to the action of a solution of a salt or salts of lead.

2. A process or method of producing an element or electrode for storage batteries by chemical reaction, which consists in subjecting a porous material to the action of a solution of a salt or salts of lead and then chemically reducing the same.

3. A process or method of producing an element or electrode for storage batteries by chemical reaction, which consists in applying a porous material to a conducting-plate, incorporating in said porous material a reducing agent, and then subjecting said porous material and plate to the action of a solution of a salt or salts of lead.

4. A process or method of producing an element or electrode for storage batteries by chemical reaction, which consists in applying a porous material to a conducting-plate, then subjecting the porous material to the action of a solution of a salt or salts of lead and chemically reducing the same, substantially as set forth.

5. A process or method of producing an element or electrode for storage batteries by chemical reaction, which consists in sewing fast to a conducting-plate a porous material, incorporating in said porous material a reducing agent, and then subjecting said porous material and plate to the action of a solution of a salt or salts of lead.

6. A process or method of producing an element or electrode for storage batteries by chemical reaction, which consists in sewing fast to a conducting-plate a porous material, then subjecting the porous material and plate to the action of a solution of a salt or salts of lead, and chemically reducing the same.

7. A process or method of producing an element or electrode for storage batteries by chemical reaction, which consists in subjecting a porous and carbonized material to the action of a solution of a salt or salts of lead and then chemically reducing the same.

8. A process or method of producing an element or electrode for storage batteries by chemical reaction, which consists in applying a porous and carbonized material to a conducting-plate, then subjecting the said material and plate to the action of a solution of a salt or salts of lead and chemically reducing the same.

9. A process or method of producing an element or electrode for storage batteries by chemical reaction, which consists in sewing fast to a conducting-plate a porous and carbonized material, then subjecting said porous material and plate to the action of a solution of a salt or salts of lead and chemically reducing the same.

10. A process or method of producing an element or electrode for storage batteries by chemical reaction, which consists in incorporating a porous material with particles of zinc, and subjecting the same to the action of a solution of a salt or salts of lead.

11. A process or method of producing an element or electrode for storage batteries by chemical reaction, which consists in applying a porous material to a conducting-plate, incorporating such porous material with particles of zinc, and subjecting the same to the action of a solution of a salt or salts of lead.

12. A process or method of producing an element or electrode for storage batteries, which consists in sewing fast to a conducting-plate a porous material, incorporating said porous material with particles of zinc, and subjecting the same to the action of a solution of a salt or salts of lead.

13. A process or method of producing an element or electrode for storage batteries by chemical reaction, which consists in incorporating a porous and carbonized material with particles of zinc, and subjecting the same to the action of a solution of a salt or salts of lead.

14. A process or method of producing an element or electrode for storage batteries by chemical reaction, which consists in applying a porous and carbonized material to a conducting-plate, incorporating said porous and carbonized material with particles of zinc, and subjecting said material and plate to the action of a solution of a salt or salts of lead.

15. A process or method of producing an element or electrode for storage batteries, which consists in sewing fast to a conducting-plate, a porous and carbonized material, incorporating said porous and carbonized material with particles of zinc, and subjecting said material and plate to the action of a solution of salt or salts of lead.

In testimony that I claim the invention set forth above I have hereunto set my hand this 15th day of April, 1903.

FREDERICK A. FELDKAMP.

Witnesses:
FREDK. C. FRAENTZEL,
GEO. D. RICHARDS.